(12) United States Patent
Brice et al.

(10) Patent No.: US 6,990,276 B2
(45) Date of Patent: Jan. 24, 2006

(54) OPTICAL WAVEFORM RECOGNITION AND/OR GENERATION AND OPTICAL SWITCHING

(75) Inventors: Lawrence D. Brice, Eugene, OR (US); Christoph M. Greiner, Eugene, OR (US); Thomas W. Mossberg, Eugene, OR (US); Dmitri Iazikov, Springfield, OR (US)

(73) Assignee: LightSmyth Technologies, Inc., Eugene, OR (US)

( * ) Notice: Subject to any disclaimer, the term of this patent is extended or adjusted under 35 U.S.C. 154(b) by 0 days.

(21) Appl. No.: 10/857,987

(22) Filed: May 29, 2004

(65) Prior Publication Data

US 2004/0258356 A1    Dec. 23, 2004

Related U.S. Application Data

(63) Continuation-in-part of application No. 10/653,876, filed on Sep. 2, 2003, now Pat. No. 6,829,417, which is a continuation-in-part of application No. 10/229,444, filed on Aug. 27, 2002, now Pat. No. 6,678,429, and a continuation-in-part of application No. 09/843,597, filed on Apr. 26, 2001, and a continuation-in-part of application No. 09/811,081, filed on Mar. 16, 2001, now Pat. No. 6,879,441.

(60) Provisional application No. 60/474,878, filed on May 30, 2003, provisional application No. 60/370,182, filed on Apr. 4, 2002, provisional application No. 60/315,302, filed on Aug. 27, 2001, provisional application No. 60/247,231, filed on Nov. 10, 2000, provisional application No. 60/235,330, filed on Sep. 26, 2000, provisional application No. 60/199,790, filed on Apr. 26, 2000, provisional application No. 60/190,126, filed on Mar. 16, 2000.

(51) Int. Cl.
  *G02B 6/36*    (2006.01)
(52) U.S. Cl. .............................. 385/37; 385/3; 385/10; 385/14; 385/16; 385/20; 359/565; 359/569
(58) Field of Classification Search .................... 385/1, 385/3, 8–10, 14, 16–24, 36, 37, 123, 569, 385/570, 576; 359/565, 566
See application file for complete search history.

(56) References Cited

U.S. PATENT DOCUMENTS

| | | | | |
|---|---|---|---|---|
| 6,678,429 B2 * | 1/2004 | Mossberg et al. | ............. | 385/10 |
| 6,829,417 B2 * | 12/2004 | Greiner et al. | ................ | 385/37 |
| 6,879,441 B1 * | 4/2005 | Mossberg | ................... | 359/569 |

* cited by examiner

*Primary Examiner*—Phan T. H. Palmer
(74) *Attorney, Agent, or Firm*—David S. Alavi

(57) ABSTRACT

A planar optical waveguide has sets of diffractive elements, each routing between input and output optical ports diffracted portions of an input optical signal. The diffractive elements are arranged so that the impulse response function of the diffractive element set comprises a reference temporal waveform or its time-reverse.

A planar optical waveguide has N×M sets of diffractive elements, each routing between corresponding input and output optical ports corresponding diffracted portions of an input optical signal. The N×M diffractive element sets, N×M input optical ports, and N 1×M optical switches enable routing of an input optical signal any of the N input optical sources to any of the M output optical ports based on the operational state of the corresponding 1×M optical switch.

54 Claims, 10 Drawing Sheets

US 6,990,276 B2

OPTICAL WAVEFORM RECOGNITION AND/OR GENERATION AND OPTICAL SWITCHING

RELATED APPLICATIONS

This application claims benefit of prior-filed provisional Application No. 60/474,878 entitled "Optical packet header coder/decoder systems and optical switch based on holographic Bragg reflectors" filed May 30, 2003 in the names of Lawrence D. Brice, Christoph M. Greiner, Thomas W. Mossberg, and Dmitri Iazikov, said provisional application being hereby incorporated by reference as if fully set forth herein.

This application is a continuation-in-part of prior-filed U.S. non-provisional application Ser. No. 10/653,876 entitled "Amplitude and phase control in distributed optical structures" filed Sep. 2, 2003 now U.S. Pat. No. 6,829,417 in the names of Christoph M. Greiner, Dmitri Iazikov, and Thomas W. Mossberg, which is in turn a continuation-in-part of U.S. non-provisional application Ser. No. 10/229,444 entitled "Amplitude and phase control in distributed optical structures" filed Aug. 27, 2002 in the names of Thomas W. Mossberg and Christoph M. Greiner, now U.S. Pat. No. 6,678,429 issued Jan. 13, 2004. Each of said application and said patent are hereby incorporated by reference as if fully set forth herein application Ser. No. 10/229,444 in turn claims benefit of provisional Application No. 60/315,302 entitled "Effective gray scale in lithographically scribed planar holographic devices" filed Aug. 27, 2001 in the name of Thomas W. Mossberg, and provisional Application No. 60/370,182 entitled "Amplitude and phase controlled diffractive elements" filed Apr. 4, 2002 in the names of Thomas W. Mossberg and Christoph M. Greiner, both of said provisional applications being hereby incorporated by reference as if fully set forth herein.

This application is a continuation-in-part of prior-filed non-provisional application Ser. No. 09/811,081 entitled "Holographic spectral filter" filed Mar. 16, 2001 now U.S. Pat. No. 6,879,441 in the name of Thomas W. Mossberg, and a continuation-in-part of prior-filed non-provisional application Ser. No. 09/843,597 entitled "Optical processor" filed Apr. 26, 2001 in the name of Thomas W. Mossberg, application Ser. No. 09/843,597 in turn being a continuation-in-part of said application Ser. No. 09/811,081. Said application Ser. No. 09/811,081 in turn claims benefit of: 1) provisional Application No. 60/190,126 filed Mar. 16, 2000; 2) provisional Application No. 60/199,790 filed Apr. 26, 2000; 3) provisional Application No. 60/235,330 filed Sep. 26, 2000; and 4) provisional Application No. 60/247,231 filed Nov. 10, 2000. Each of said non-provisional applications and each of said provisional applications are hereby incorporated by reference as if fully set forth herein.

BACKGROUND

The field of the present invention relates to optical devices incorporating distributed optical structures. In particular, methods and apparatus for optical waveform recognition and/or generation and for optical switching, with distributed optical structures, are disclosed herein.

SUMMARY

An optical apparatus comprises a planar optical waveguide having at least one set of diffractive elements. Each diffractive element set routes, between corresponding input and output optical ports with a corresponding impulse response function, a corresponding diffracted portion of an input optical signal propagating in the planar waveguide that is diffracted by the diffractive element set. The input optical signal has an input temporal waveform, the output optical signal has an output temporal waveform, and the output temporal waveform is given by a convolution of the input temporal waveform and the impulse response function. The input optical signal is successively incident on the diffractive elements. The diffractive elements of the set are arranged so that the corresponding impulse response function is proportional to one of i) a corresponding reference temporal waveform, or ii) a time-reverse of the corresponding reference temporal waveform.

An optical apparatus comprises a planar optical waveguide having N×M sets of diffractive elements, and a set of N 1×M optical switches. Each diffractive element set routes, between a corresponding one of N×M input optical ports and a corresponding one of M output optical ports, a corresponding diffracted portion of an input optical signal propagating in the planar waveguide that is diffracted by the diffractive element set. The input optical signal is successively incident on the diffractive elements. For each pair of one of the N×M input optical ports and one of the M output optical ports there is a corresponding one of the N×M diffractive element sets that routes an optical signal therebetween. Each 1×M optical switch couples a corresponding one of N input optical sources to a corresponding one of N disjoint subsets of M input optical ports, so that an input optical signal from any one of the N input optical sources may be routed to any one of the M output optical ports based on the operational state of the corresponding 1×M optical switch.

Objects and advantages pertaining to recognition and/or generation of optical waveforms and optical switching may become apparent upon referring to the disclosed embodiments as illustrated in the drawings and disclosed in the following written description and/or claims.

Figure 1:
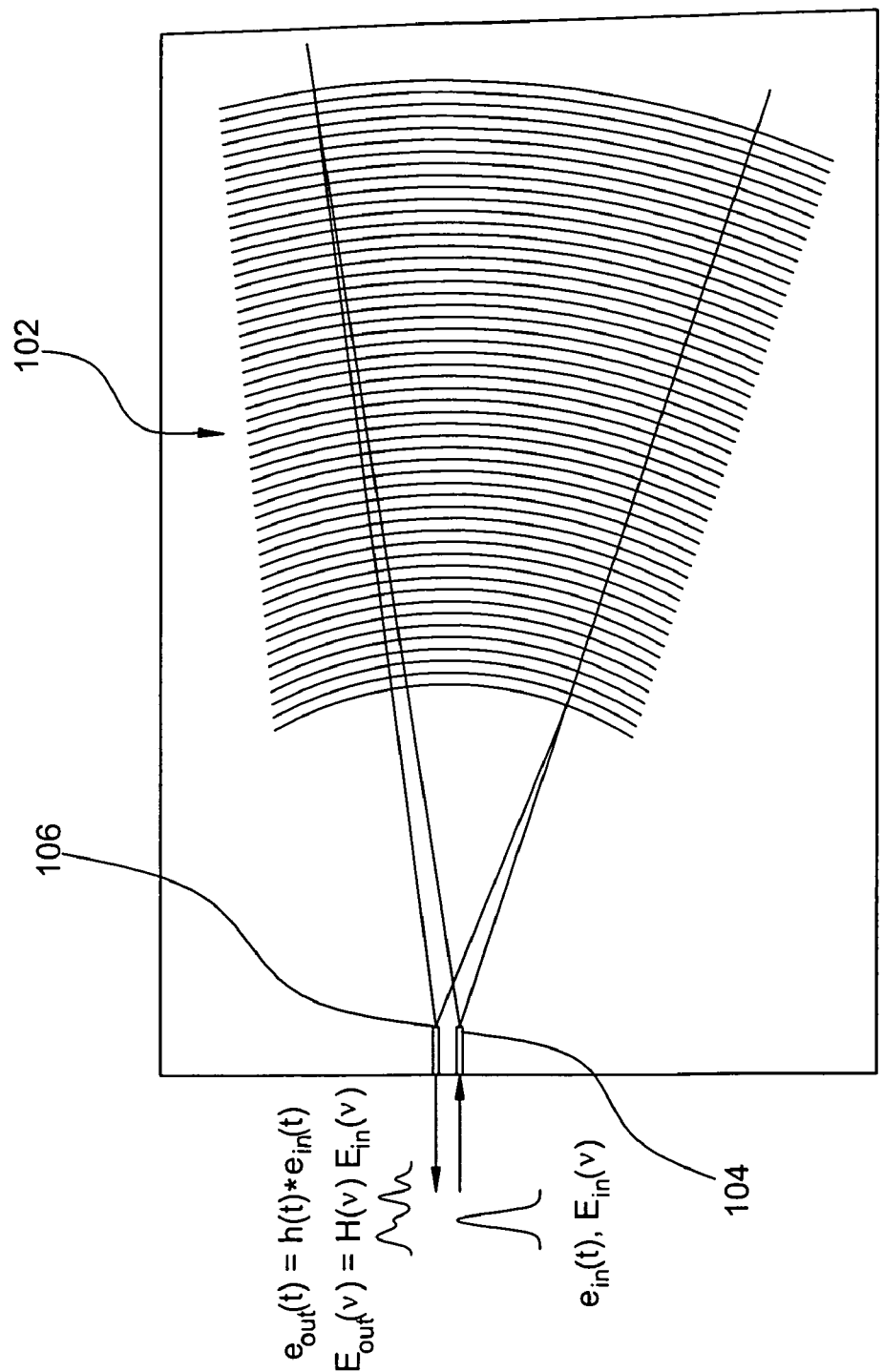
FIG. 1 illustrates schematically transformation of an input optical signal by a diffractive element set.

The embodiments shown in the Figures are exemplary, and should not be construed as limiting the scope of the present disclosure and/or appended claims.

DETAILED DESCRIPTION OF EMBODIMENTS

An optical apparatus according to the present disclosure comprises a planar optical waveguide having at least one set of diffractive elements. The planar optical waveguide substantially confines in one transverse dimension optical signals propagating in the other two spatial dimensions. The planar waveguide typically comprises a core (a two-dimensional sheet or layer) surrounded by lower-index cladding. The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) The planar waveguide may be secured to a substrate, for facilitating manufacture, for mechanical support, and/or for other reasons.

The set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a directional photonic-bandgap structure; a mode-selective photonic crystal; or other equivalent terms of art. Each diffractive element of the set diffracts, reflects, scatters, or otherwise redirects a portion of an incident optical signal (said process hereinafter simply referred to as diffraction). Each diffractive element of the set typically comprises some suitable alteration of the planar waveguide (ridge, groove, index modulation, density modulation, and so on), and is spatially defined by a virtual two-dimensional curvilinear diffractive element contour, the curvilinear shape of the contour typically being configured to impart desired spatial characteristics onto the diffracted portion of the optical signal. Implementation of a diffractive element with respect to its virtual contour may be achieved in a variety of ways, including those disclosed in the references cited hereinabove. Each curvilinear diffractive element is shaped to direct its diffracted portion of the optical signal to an output optical port. The relative spatial arrangement (e.g. longitudinal spacing) of the diffractive elements of the set, and the amplitude diffracted from each diffractive element of the set, yield desired spectral and/or temporal characteristics for the overall diffracted optical signal routed between the input and output optical ports. It should be noted that optical ports (input and/or output) may be defined structurally (for example, by an aperture, waveguide, fiber, lens, or other optical component) and/or functionally (i.e., by a spatial location, convergence/divergence/collimation, and/or propagation direction). For a single-mode planar waveguide, such a set of diffractive elements may be arranged to yield an arbitrary spectral/temporal transfer function (in terms of amplitude and phase). In a multimode planar waveguide, modal dispersion and mode-to-mode coupling of diffracted portions of the optical signal may limit the range of spectral/temporal transfer functions that may be implemented.

The curvilinear diffractive elements of the set (or equivalently, their corresponding contours) are spatially arranged with respect to one another so that the corresponding portions of the optical signal diffracted by each element interfere with one another at the output optical port, so as to impart desired spectral and/or temporal characteristics onto the portion of the optical signal collectively diffracted from the set of diffractive elements and routed between the input and output optical ports. The diffractive elements in the set are arranged so that an input optical signal, entering the planar waveguide through an input optical port, is successively incident on diffractive elements of the set. For the purposes of the present disclosure and/or appended claims, "successively incident" shall denote a situation wherein a wavevector at a given point on the wavefront of an optical signal (i.e., a wavefront-normal vector) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal, and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

The set of diffractive elements provides dual functionality, spatially routing an optical signal between an input optical port and an output optical port, while at the same time acting to impart a spectral/temporal transfer function onto the input optical signal to yield an output optical signal. The curvilinear diffractive elements may be designed (by computer generation, for example) so as to provide optimal routing, imaging, or focusing of the optical signal between an input optical port and a desired output optical port, thus reducing or minimizing insertion loss. Simple curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references cited hereinabove. The following are exemplary only, and are not intended to be exhaustive.

Diffractive elements may be formed lithographically on the surface of a planar optical waveguide, or at one or both interfaces between core and cladding of a planar optical waveguide. Diffractive contours may be formed lithographically in the interior of the core layer and/or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter (described further hereinbelow). The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. Essentially, each diffractive element contour may be optimized to image the input port onto the output port in a phase coherent manner. Inputs to the design are the detailed structure of the input and output optical ports and their locations. Standard ray tracing approaches to optical element design may provide a diffractive contour at each optical distance into the planar waveguide that will provide an optimal imaging of the input signal at the input port onto the optimal output signal at the output port. Simple curves may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between diffracted components at the output port, and/or the diffractive strength of the elements may be individually controlled as well (as described in detail in the references cited hereinabove).

An alternative approach to designing the diffractive element contours for a diffractive element set is to calculate interference patterns between simulated fields at a desired wavelength and with desired waveforms entering the input port and exiting the output port. In forming or writing a summed pattern for the diffractive element set, suitable discretization is applied as needed for any lithographic or UV exposure approach that is utilized for fabrication. The holographic structure may be designed by interference of computer-generated beams having the desired computer-generated temporal waveforms, with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform.

In an alternative method for making the diffractive element structure, the core consists of a material of appropriate index that is also photosensitive at the wavelength of the desired operational signal beams. As in traditional holography, the input and output recording beams (same wavelength as operational signal beams of the envisioned device) are overlapped in the core and the interference pattern between them is recorded. Subsequently the core material is developed and, if necessary, a cladding may be deposited or attached by other means.

FIG. 1 illustrates schematically the general spectral/temporal filtering functionality that may be provided by a holographic Bragg reflector (HBR; also referred to as a set of diffractive elements, as well as other terminology set forth hereinabove). As illustrated in FIG. 1, the diffractive element set 102 acts as a generalized spectral filter with an input port 104 and an output port 106. The diffractive element set may be characterized in the time domain by its impulse response function h(t), and may be equivalently characterized in the frequency domain by its spectral transfer function H(ν) (which contains both amplitude and phase information, which may be represented mathematically as a complex-valued function). As is known in the art, h(t) and H(ν) are related by Fourier transform. The filtering functionality of the diffractive element set may be described in the time domain as follows: an input optical signal with electric-field temporal waveform $e_{in}(t)$ enters at input port 104, interacts with the diffractive element set, and emerges at output port 106 with an electric field temporal waveform $e_{out}(t)$ given by the convolution of h(t) and $e_{in}(t)$. Equivalently, the output temporal waveform $e_{out}(t)$ is given by the cross correlation of $e_{in}(t)$ and h(−t) (a time-reverse of the impulse response function h(t)). The filtering functionality of the diffractive element set may be described in the frequency domain as follows: an input optical signal with electric-field spectral profile represented by a spectrum $E_{in}(ν)$ enters at input port 104, interacts with the diffractive element set, and emerges at output port 106 with an electric field spectral profile represented by a spectrum $E_{out}(ν)$ given by the product of H(ν) and $E_{in}(ν)$. It should be noted that h(t) and H(ν) may vary based on the direction of propagation of the input optical signal through the diffractive element set (described further hereinbelow), and must typically be defined relative to a corresponding pair of input and output optical ports. Note that if each element of the diffractive element set is only weakly diffracting, the spectral transfer function $H(\nu)$ is related to the spatial Fourier transform of the structure of the diffractive element set. For more strongly diffracting sets of diffractive elements, the relationship between $H(\nu)$ and the internal spatial structure of the set is more complex but may still be readily determined by methods known in the art, particularly those relating to fiber Bragg gratings and optical thin film filters.

It should be noted that the temporal waveforms described herein may exhibit amplitude, phase, and/or frequency modulation in any desired combination, and that the "temporal waveform" refers to all variation of the optical fields with time, including oscillations at a carrier frequency. It should be noted that a first temporal waveform described as comprising, including, the same as, equal to, equivalent to, matching, etc, a second waveform may differ by an overall multiplicative factor (which may include appropriate units). A first waveform comprising or including a second waveform may or may not have additional temporal features not present in the second waveform.

By implementing a diffractive element set with a selected impulse response function $h(t)$ (equivalently, a selected spectral transfer function $H(\nu)$), the diffractive element set may function to recognize (i.e. decode) and/or to generate (i.e. encode) a selected reference temporal waveform. Such reference temporal waveforms may include, for example, packet headers or subheaders, routing data, encryption or security data, sender and/or receiver identification data, and so forth. For recognizing a selected reference temporal waveform, for example, a diffractive element set may function to cross-correlate the input temporal waveform against a selected reference temporal waveform to produce characteristic output signals when a match occurs. The output signal temporal waveform is a cross correlation of the input temporal waveform and the selected reference temporal waveform when the impulse response function $h(t)$ is a time-reversed copy of the selected reference temporal waveform. In another example, to generate a selected reference temporal waveform, an input temporal waveform in the form of a relatively short pulse yields an output temporal waveform substantially equivalent to the selected reference temporal waveform, when the impulse response function $h(t)$ is equal to the selected reference temporal waveform.

Figure 2:
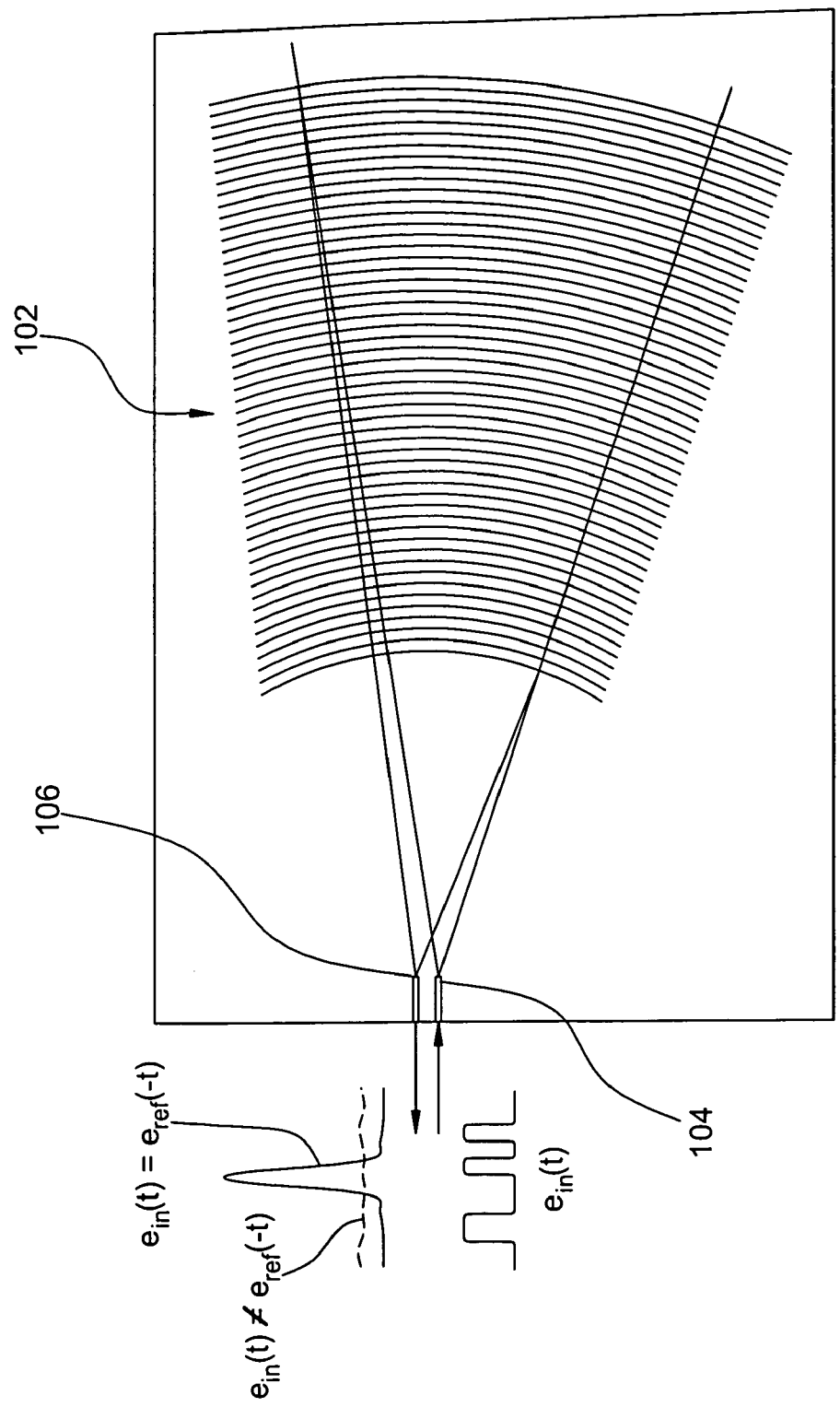
FIG. 2 illustrates schematically optical temporal waveform recognition using a diffractive element set.

FIG. 2 schematically illustrates how the general filtering functionality of a set of diffractive elements may be exploited for recognizing a selected reference temporal waveform (for optical header recognition or decoding, for example). The diffractive element set is programmed with an impulse response function $h(t)=e_{ref}(-t)$, where $e_{ref}(-t)$ is the time-reverse of the selected reference optical waveform. The output signal temporal waveform therefore represents the temporal cross-correlation of the input signal stream $e_{in}(t)$ with the reference waveform $e_{ref}(t)$. Programming of the diffractive element set impulse response function to be $e_{ref}(-t)$ may be achieved by any suitable means, including those disclosed in the references cited hereinabove. When the electric field temporal waveform $e_{in}(t)$ of the input optical signal entering the input port 104 substantially matches or includes the electric field temporal waveform $e_{ref}(t)$ of the selected reference optical waveform, the cross-correlation temporal waveform appearing at the output port 106 is a relatively temporally short auto-correlation pulse of relatively high power. Other input optical signals with temporal electric field waveforms $e_{in}(t)$ that do not substantially match or include the reference temporal waveform $e_{ref}(t)$ produce cross-correlation temporal waveforms of relatively lower power and relatively greater temporal length. Electronic and/or optical threshold discrimination applied to the output optical signal may therefore be employed to determine whether the input optical signal temporal waveform matches the reference temporal waveform, i.e., to recognize the presence of the reference temporal waveform in the input optical signal. In particular, threshold discrimination, either direct or after further linear or non-linear optical and/or electronic signal processing, may be employed to determine when shorter and higher power output optical signals arrive at the output optical port, thus indicating arrival of a temporal waveform at the input port 104 that matches the reference temporal waveform $e_{ref}(t)$.

Note that the physical device length through the diffractive element set (L), required to process an input optical signal of temporal duration $\Delta t$, is given approximately by $L \approx c\Delta t/2n$, where n is the effective refractive index relevant to signal propagation in the planar waveguide through the diffractive element set and c is the vacuum speed of light. For a silica slab-waveguide-based optical cross-correlator, a length of about 2 cm is required to process for potential recognition an input temporal waveform comprising 6 bits at a data rate of 40 GHz. The same device length would allow identification of a 16-bit 100 Gbit/sec or a 160-bit 1 Tbit/sec input temporal waveform. The cross-correlator processing time, proportional to the roundtrip of the input signal through the device, would only be several hundred picoseconds for all cases. In the frequency domain description of device operation, for the device to resolve spectral features of width $\Delta\nu$, it needs to have a device length of at least $L \approx c/(2n\Delta\nu)$.

Figure 3:
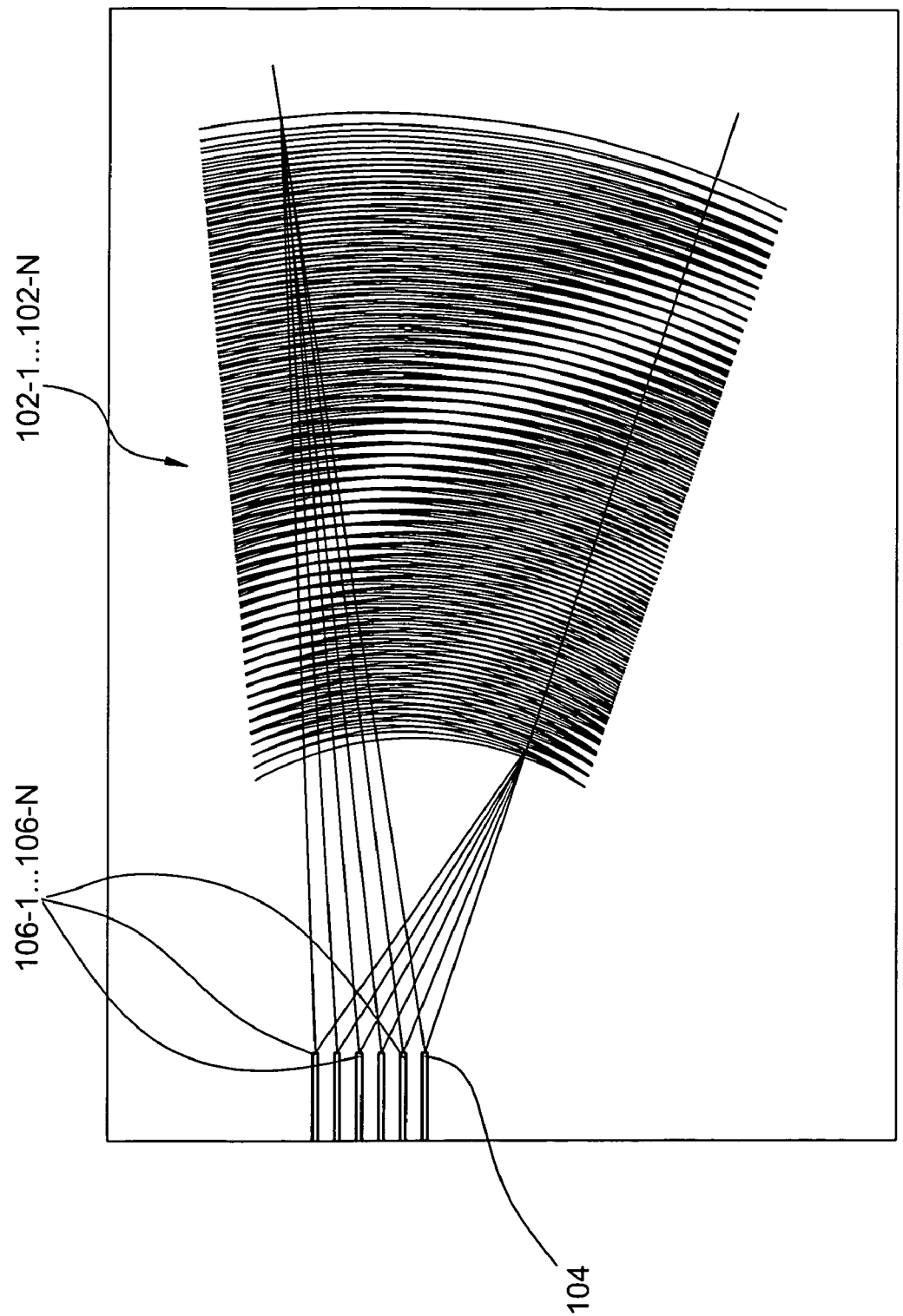
FIG. 3 illustrates schematically multiple overlaid diffractive element sets.

FIG. 3 schematically illustrates generalization to a planar waveguide device with multiple sets of diffractive elements, each arranged so as to compare an input temporal waveform to multiple reference temporal waveforms. In a manner similar to that previously described, the multiple reference temporal waveforms (time-reversed) are "stored" (i.e. programmed) as the impulse response functions of the respective sets of diffractive elements. The device of FIG. 3 consists of N individual diffractive element sets 102-1 . . . 102-N that are overlaid on a common planar waveguide substrate. Overlay of the diffractive element sets may be implemented according to the teachings of the references cited hereinabove. The multiple sets of diffractive elements may be arranged with a common input optical port 104 but with spatially separate output optical ports 106-1 . . . 106-N. The output temporal waveform appearing at each output optical port 106-1 . . . 106-N of the device shown in FIG. 3 is a cross-correlation of the common input optical signal temporal waveform and the respective reference temporal waveforms programmed into each of the diffractive element sets 102-1 . . . 102-N that couples the input optical port 104 and the respective output optical port 106-1 . . . 106-N. If the input temporal waveform matches the reference temporal waveform signature programmed into any constituent diffractive element set(s), a relative short, relatively intense auto-correlation pulse appears at the corresponding output optical port(s). While the device example of FIG. 3 incorporates overlaid diffractive element sets, similar devices may be constructed by stacking (i.e., positioning sequentially along the path of the input optical signal) or by interleaving the constituent diffractive element sets as disclosed in the references cited hereinabove. Output optical signals may pass through the respective output optical ports simultaneously or at successive times, depending on the relative spatial arrangement of the diffractive element sets and optical ports. Time delay between entry of an optical signal into the input port and arrival of an output optical signal at the corresponding output optical port is determined by the optical path length between the optical ports. This distance may be determined on a output-port-specific basis via spatial placement of the corresponding diffractive element set that routes processed optical signals between the input optical port and the corresponding output optical port.

Figure 4:
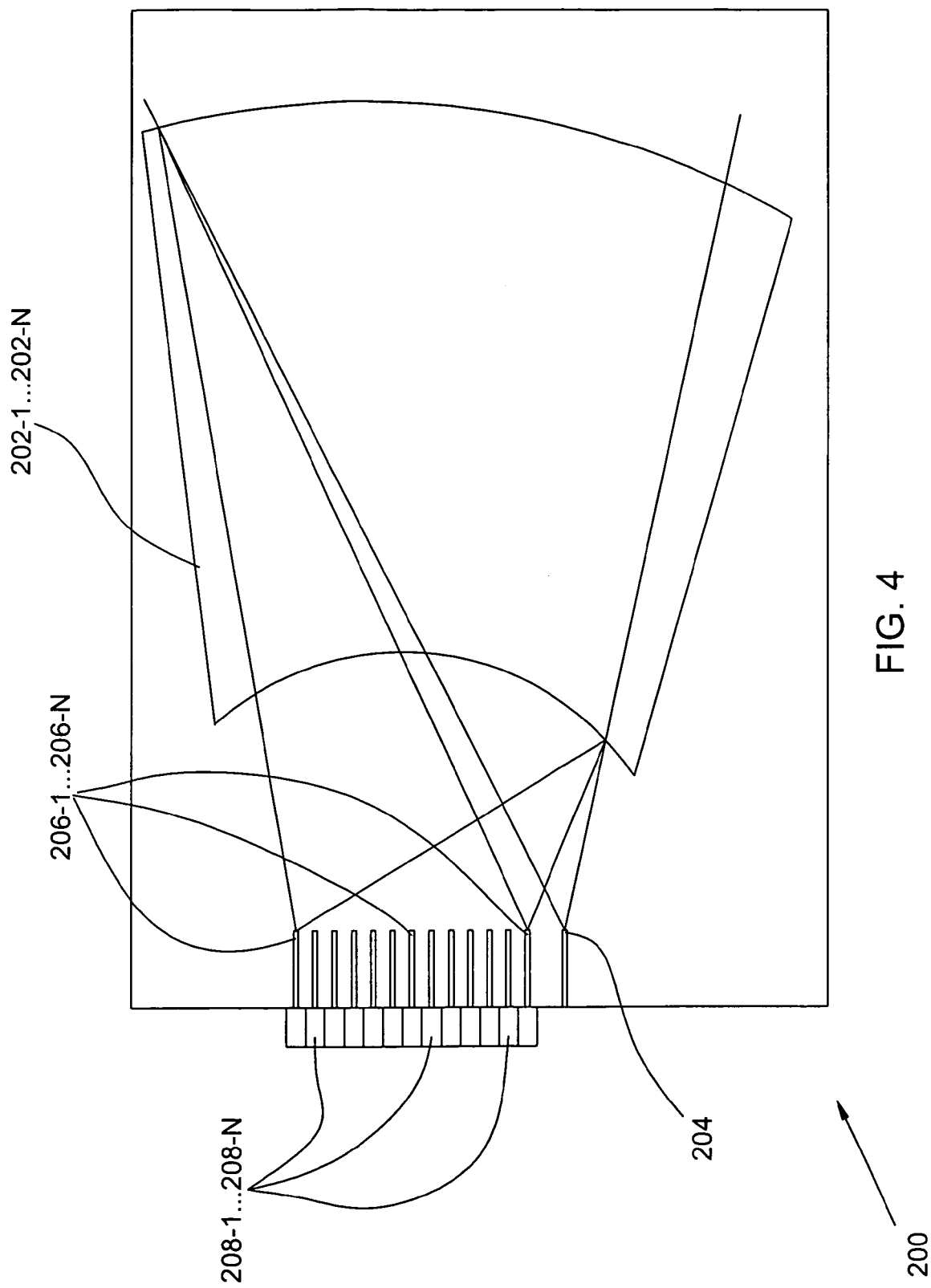
FIG. 4 illustrates schematically multiple overlaid diffractive element sets and a photodetector array.

FIG. 4 depicts an N-waveform optical waveform recognition system 200 comprising a planar waveguide having N overlaid (and/or stacked and/or interleaved) 11 diffractive element sets 202-1 . . . 202-N (individual diffractive elements not explicitly shown in FIG. 4), a common input optical port 204, N distinct output optical ports 206-1 . . . 206-N, and a set of N photodetectors 208-1 . . . 208-N. The N photodetectors are arranged to receive corresponding output optical signals transmitted through corresponding output optical ports, which are in turn arranged to receive corresponding output optical signals processed by the diffractive element sets. The photodetectors may be arranged as a linear array on a common photodetector chip, or any other suitable arrangement of the photodetectors may be employed. A suitably chosen discrimination threshold may be employed with the photodetectors to distinguish between a relatively shorter, relatively more intense autocorrelation waveform or pulse (resulting from a substantial match between the input temporal waveform and the reference temporal waveform programmed into the corresponding diffractive element set) and a relatively longer, relatively less intense cross-correlation waveform (resulting from mismatch between the input temporal waveform and the reference temporal waveform encoded into the corresponding diffractive element set). The output of the photodetectors thus thresholded may therefore comprise a parallel electronic word with one bit high indicating the value of the matching input signal, e.g. a recognized packet header, address label, or other reference temporal waveform. In a specific example, a reference temporal waveform constitutes a sequence of 6 temporal binary bits yielding waveforms representing various possible different reference waveform states. The temporal duration of each bit in this example is ⅙ of the total duration of the reference waveform (the total duration being designated $\tau_p$).

An advantage inherent to the device of FIG. 4 is that the resulting electronic data rate is the rate at which reference waveforms are input to the device, rather than the rate of the temporal bits in the waveform. Therefore, in the specific example of a 6-bit waveform, the maximal processing speed needed in an electronic control unit is reduced from the optical bit rate by a factor 6. As a practical matter it may not be possible to reliably distinguish between all possible reference waveform states of a bit sequence. For example it should be noted that, in a simple, non-return-to-zero (NRZ), constant phase optical data stream, the number N of readily distinguishable packet 11 reference waveforms scales roughly as the number of individual bits in the waveform. In the 6-bit example described above, only six readily distinguishable waveforms are typically available. While precision thresholding may in principle enable recognition of larger numbers of different temporal waveform states (as described above), addition of auxiliary signal modulation (phase, frequency, and/or amplitude modulation) outside the bit bandwidth may instead be employed to ease threshold precision requirements, for example by enhancing the difference in auto- and cross-correlation peak heights. For example, if the exemplary 6-bit reference temporal waveforms are phase modulated with bandwidth $\Delta v_m$ set so that $\tau_p \Delta v_m > 6$, auto- and cross-correlation contrasts will be enhanced. Increasing $\Delta v_m$ so that $\tau_p \Delta v_m \approx N$ (N being the number of different temporal waveform states to be distinguished) may be desirable to enhance contrast among auto- and cross-correlation signals. The auxiliary modulation just described may be introduced by passage of suitable signals through suitably adapted diffractive element sets at the transmitter location.

In the device implementations of FIGS. 3 and 4, the output optical signals diffracted by the device's constituent diffractive element sets are directed to spatially distinct output optical ports. Alternatively, all of the diffracted output optical signals may be directed to a common output optical port (not shown). In such an implementation, the constituent diffractive element sets may be spatially displaced relative to one another so that the respective processed diffracted output optical signals arrive sequentially at the single output optical port. As such, the sequence of output optical signals may constitute a serial electronic word, with one bit high indicating which of the programmed reference temporal waveforms matches the input temporal waveform. Waveform recognition devices providing processed channel signals sequentially in a single optical signal stream shall fall within the scope of the present disclosure and/or appended claims.

The recognition of specific reference waveforms by the devices of FIGS. 3 and 4 and similarly configured devices may be employed for a wide variety of purposes. The recognition of a reference waveform may determine at least in part the operational state of an optical switch, for example. Such an optical switch may be used to route the recognized optical waveform, or to route some other waveform in a multi-component, multiple-signal device or system. Nor are such control functions based on optical waveform recognition restricted to controlling optical devices. Recognition of an optical waveform as disclosed herein may determine at least in part the operational state of any device operationally coupled to the waveform recognition device. These may include without limitation optical devices, electronic devices, mechanical devices, and/or various combinations and/or systems thereof.

Figure 5:
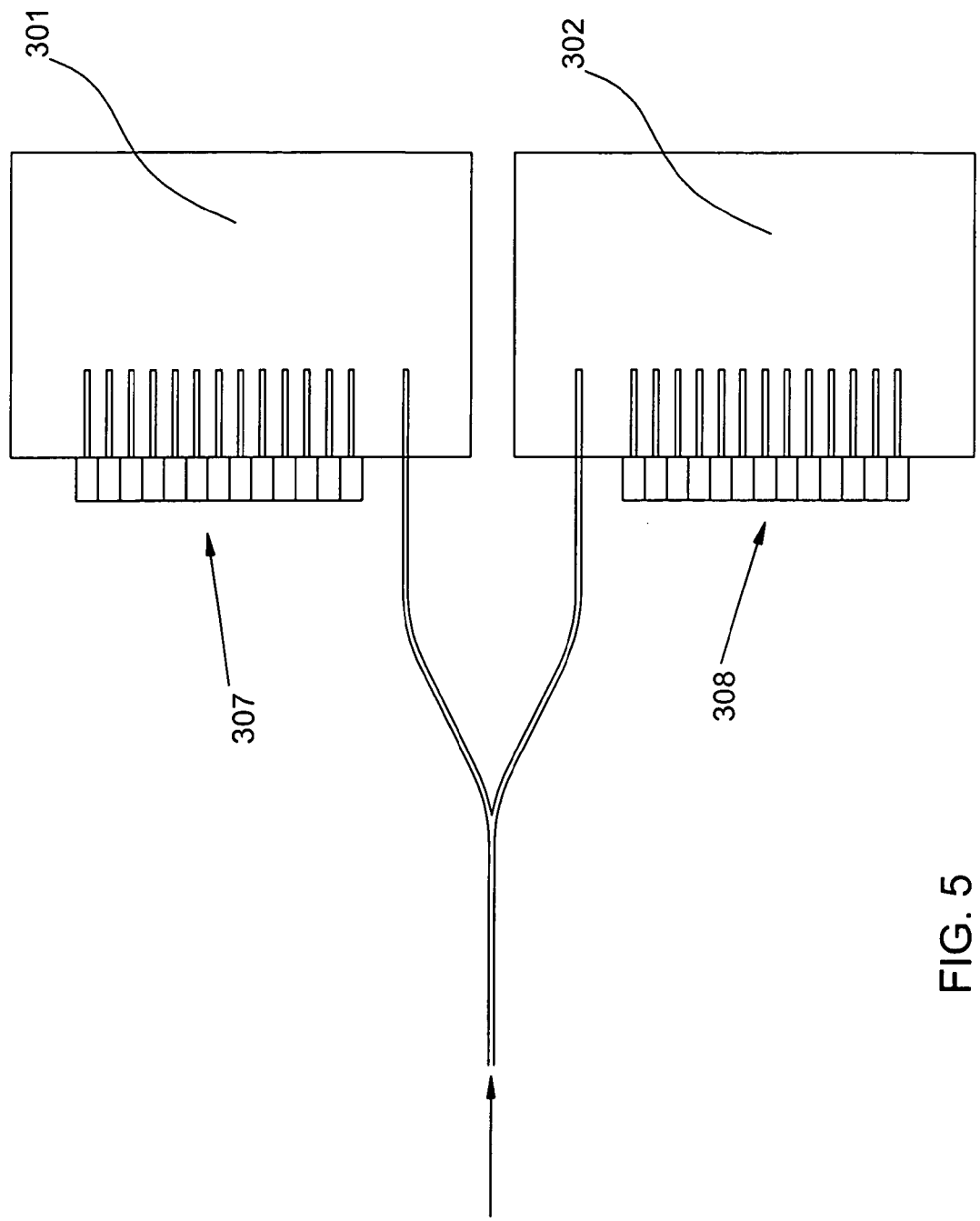
FIG. 5 illustrates schematically two devices for recognizing sub-waveforms of an optical waveform.

Sets of diffractive elements may be employed so as to provide for independent recognition of temporal waveform segments within a larger waveform (such as sub-headers of an optical packet header, for example). Such an approach is schematically depicted in FIG. 5 (diffractive element sets not explicitly shown). An overall temporal waveform comprises two sub-waveforms. The input waveform is optically split and each fraction is input to the two waveform recognition devices 301 and 302, each having diffractive element sets corresponding to respective sets of reference sub-waveforms to be detected. The device 301 in FIG. 5 is programmed to recognize any one of the N states 1 . . . N of the first sub-waveform, while device 302 is programmed to recognize any one of the M states N+1 . . . N+M of the second sub-waveform. The resulting device output may consist of two electronic words from corresponding photodetector arrays 307 and 308, each with one bit high to indicate the state of the corresponding sub-waveform. Optical delay may be introduced so that the electronic output words occur simultaneously or with any other relative timing that may be needed or desired.

Figure 6:
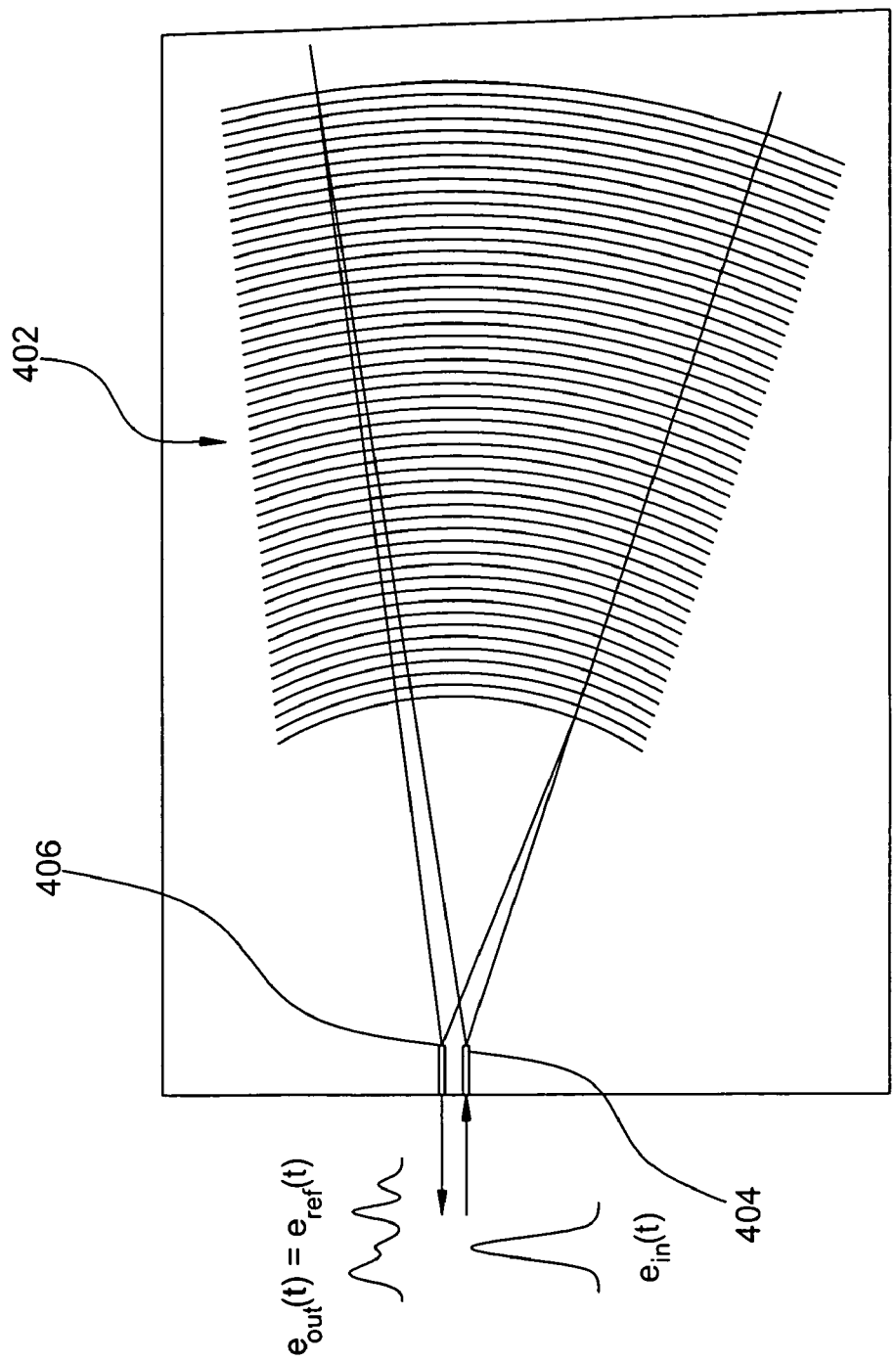
FIG. 6 illustrates schematically generation of an optical waveform using a diffractive element set.

Planar waveguides with diffractive element sets may also be used to generate temporal waveforms, including reference optical waveforms. FIG. 6 schematically illustrates this application. An input optical signal with an input temporal waveform $e_{in}(t)$ in the form of a temporally short pulse enters input optical port 404 and is diffracted from diffractive element set 402, which is arranged to exhibit an impulse response function h(t) between the respective input and output ports that matches a desired reference waveform $e_{ref}(t)$ (not the time reverse in this case). If the pulse duration of the input optical waveform (pulse) is at least as short as the shortest temporal feature of the impulse response function h(t) (equivalently, if the input optical pulse is at least as wide spectrally as the spectral transfer function corresponding to h(t)), the output optical signal will have an output temporal waveform $e_{out}(t)$ substantially equal to $e_{ref}(t)$. For example, if the elements of a diffractive element set are arranged so that $e_{ref}(t)$ corresponds to a particular reference temporal waveform, then a sufficiently short input optical pulse results in an output optical signal temporal waveform corresponding to that reference waveform. In some cases, injection of a short input optical pulse as described above may be undesirable or not readily achieved. More generally, a wide variety of input pulses or waveforms may serve to yield a desired output optical signal temporal waveform (e.g. a desired one of a set of recognized packet header temporal waveforms), by suitably arranging the diffractive elements of the set so that the convolution of h(t) and the input pulse yields the desired output signal temporal waveform in response to the expected input optical signal temporal waveform.

It should be noted that the output temporal waveforms thus produced are amenable to waveform recognition schemes such as those described hereinabove. It should be noted however that the same diffractive element set with the same input and output ports cannot typically function to both generate and recognize the same reference waveform. Recall that generation of $e_{ref}(t)$ from a short input pulse requires a diffractive element set whose impulse response between the ports is $e_{ref}(t)$, while recognition of $e_{ref}(t)$ requires a diffractive element set whose impulse response between the ports is $e_{ref}(-t)$ (time-reversed). It may be possible to use a common diffractive element set to both generate and recognize a given reference temporal waveform $e_{ref}(t)$ under certain circumstances. Separate sets of ports must be used for the generation and recognition processes (not shown), with the spatial propagation of an input signal from the generation input port through the diffractive element set corresponding to the time-reversed spatial propagation of an input signal from the recognition input port, and likewise for the generation and recognition output ports. In addition, the overall diffraction of the diffractive element set should be relatively low (perhaps around 50% or less) to reduce distortions due to signal depletion through the diffractive element set.

Figure 7:
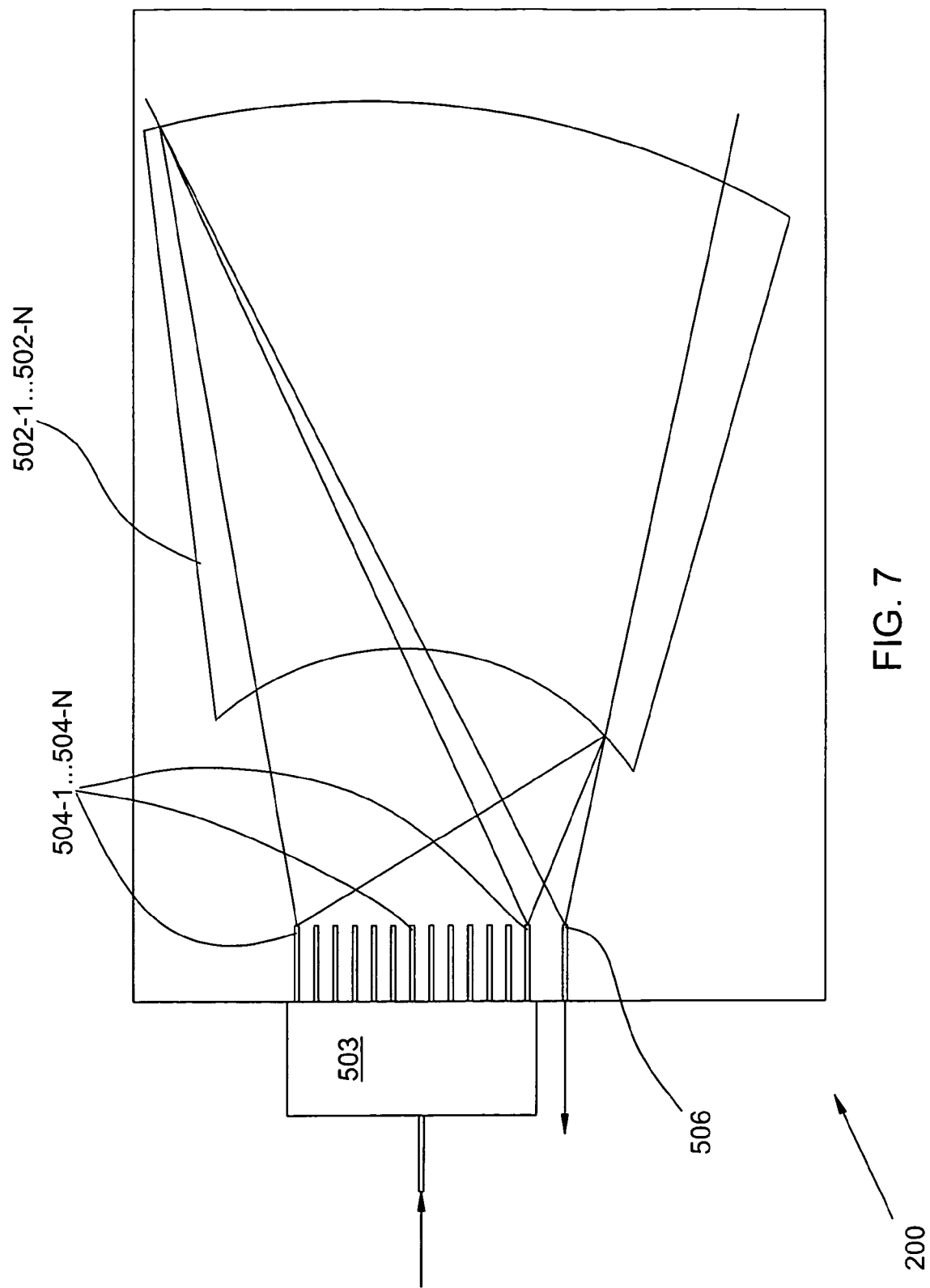
FIG. 7 illustrates schematically generation any of a selectable set of optical waveforms using an optical switch and multiple diffractive element sets.

FIG. 7 illustrates schematically an optical device wherein an input optical signal may be encoded with a selected one of a set of reference temporal waveforms. An input optical pulse from an input optical source may be directed to a 1×N optical switch 503 (which may be of any suitable type). The N outputs of the optical switch 503 are coupled to different input optical ports 504-1 . . . 504-N of a planar waveguide waveform generator (i.e. encoder) having N distinct 502-1 . . . 502-N diffractive element sets, each arranged to produce one of a set of N reference temporal waveforms. The diffractive element sets all route their respective output optical signals to a common output optical port 506. As previously described, the diffractive element sets may be spatially distinct, overlaid, stacked, and/or interleaved on the waveform generator planar optical waveguide. A particular reference temporal waveform is selected for encoding onto the input optical signal based on the operational state of the 1×N optical switch. This all-optical approach to waveform generation (e.g. packet header or address label generation) may be employed to create waveforms with bandwidths and temporal structures difficult to achieve by electronic means, and may be implemented within a relatively compact device footprint. In the specific example of FIG. 7, the 1×N optical switch 503 (which may employ Mach-Zender, MEMS, or any other suitable optical switching technology) is used to dynamically select which reference temporal waveform is to be imparted on the input optical signal. The embodiment of FIG. 7 may also be applied to the generation of coded bits for optical code-division multiple access (OCDMA) communication systems (described further hereinbelow). For example, a waveform generator assembly as illustrated schematically in FIG. 7 may enable rapid switching between all the codes or a subset of the codes employed in a particular OCDMA network.

Figure 8:
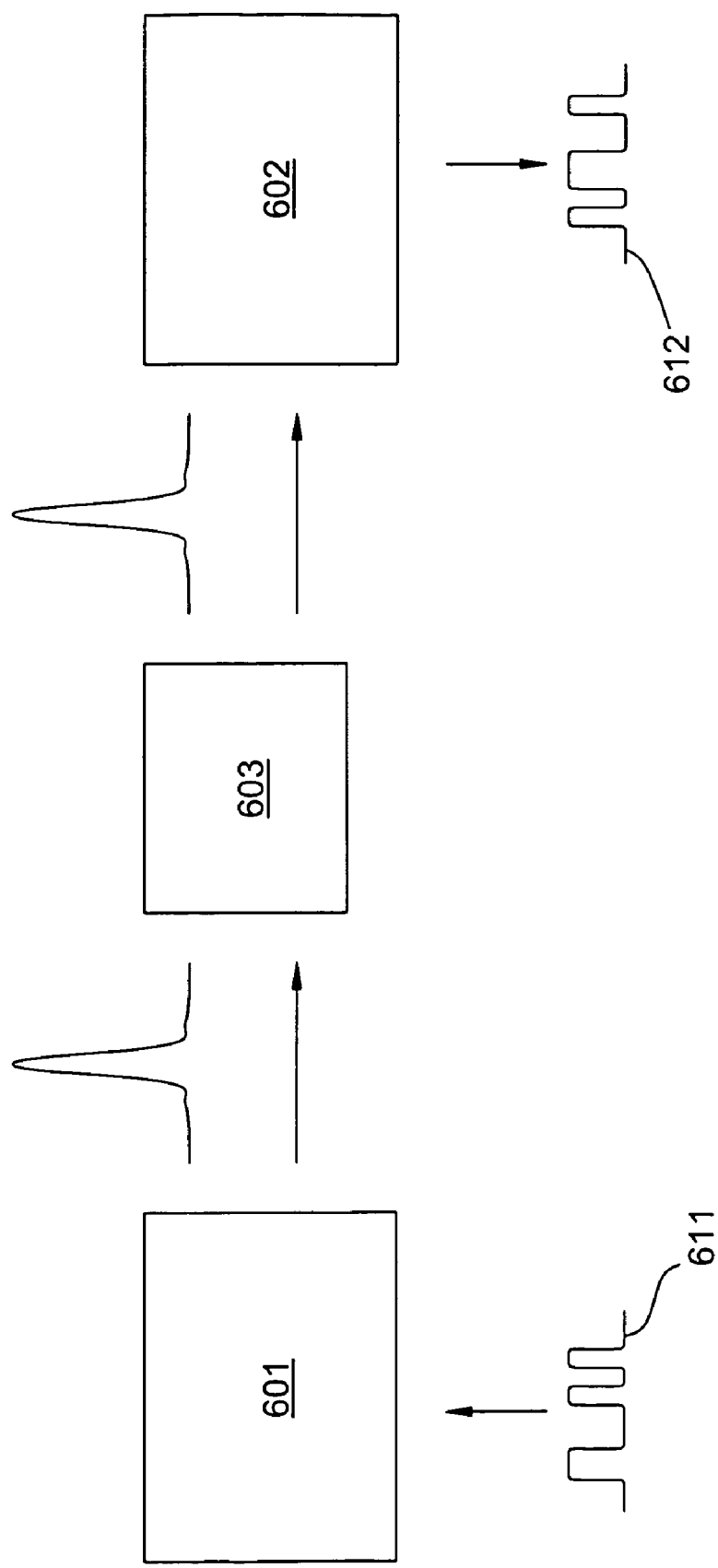
FIG. 8 illustrates schematically optical waveform conversion using two diffractive element sets.

When reference optical waveforms share the same spectral content, optical cross-correlators based on diffractive element sets enable processing, regeneration, and/or swapping of packet headers, address labels, routing data, or other data in an all-optical environment, without ever resorting to optical/electronic (O/E) conversion. FIG. 8 schematically illustrates this application. The autocorrelation pulse optical output from diffractive-element-set-based waveform recognizer 601 (resulting from detecting a matching reference temporal waveform 611, as described hereinabove) is fed into a diffractive-element-set-based waveform generator 602 for generating a reference waveform 612. An optical thresholder 603 may be employed between the recognizer and the generator, although in some cases optical thresholding may not be necessary. If thresholding is not necessary, the functions of waveform recognizer 601 and waveform generator 602 may be combined into a suitably arranged single set of diffractive elements whose spectral transfer function is the product of the transfer functions of waveform recognizer 601 and waveform generator 602. Reconfigurable recognition and generation of reference temporal waveforms may be achieved by replacing the single-diffractive-element-set waveform generator 602 with a reconfigurable multiple-diffractive-element-set device as in FIG. 7, thereby allowing selection of a desired output reference waveform via the operational state of a 1×N optical switch. In this way, a reconfigurable device as shown in FIG. 7 may be employed to accept input signals having a specific reference waveform and to transform them into a selected one of N possible output reference waveforms. Alternatively, the output of a reconfigurable multiple-diffractive-element-set waveform recognizer with an input 1×N optical switch (as in FIG. 7) may be coupled into the input of a single-diffractive-element-set waveform generator. In this way, any of a set of incoming temporal waveforms may be converted to a common selected output waveform based on the operational state of the optical switch.

In yet another variation of optical waveform transformation using diffractive element sets, two reconfigurable devices (as shown in FIG. 7) may be connected in series. The first reconfigurable device has a family of diffractive element sets, each of which transforms a corresponding input reference waveform into a common output waveform having a common spectrum (for example the short pulse of FIG. 8). The first 1×N optical switch is set to the input channel designed to convert a selected one of the input reference waveforms to the common output waveform. The output of the first reconfigurable waveform recognition device is connected to the input of a second reconfigurable device acting as reconfigurable waveform generator as in FIG. 7. The second reconfigurable device has a family of diffractive element sets, each of which transforms a common input signal (the common output signal from the first device) to a corresponding one of multiple output reference waveforms. The second 1×N optical switch is set to the input channel designed to convert the common input signal to a selected one of the output reference waveforms. In this way an optical signal encoded according to one of a set of recognized optical codes (i.e. reference waveforms) may be recoded to any other optical code of the set, or even to an optical code of a different code set. All elements of the described waveform converter may be integrated onto a single planar waveguide.

The planar waveguides with diffractive element sets, including those arranged for functioning as waveform recognizers and waveform generators, may be readily utilized as the basis for several types of optical switches, ranging from optical switches that are fully electronically set to hybrid electronic-optical architectures to all-optical switches.

Figure 9:
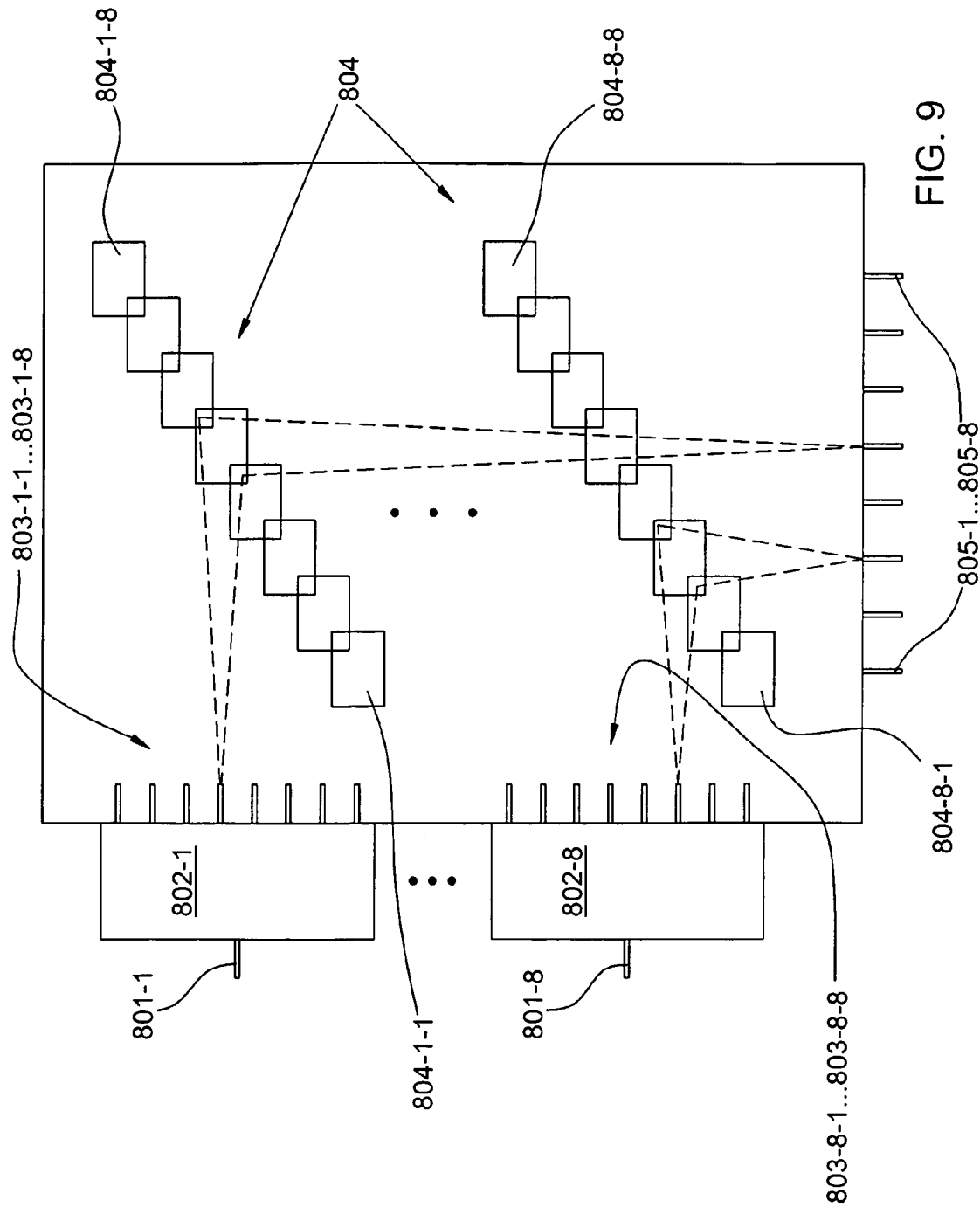
FIG. 9 illustrates schematically an 8×8 optical switch using 8 1×8 optical switches and an 8×8 array of diffractive element sets.

FIG. 9 schematically illustrates a simple 8×8 switch. The input to the switch consists of eight input optical sources 801-1 . . . 801-8, such as optical fibers. Each optical input source is coupled to a corresponding 1×8 optical switch 802-1 . . . 802-8 that is set to route the incoming signal through a corresponding one of a set of 64 input optical ports 803-1-1 . . . 803-8-8 to a corresponding one of a set of 64 diffractive element sets 804-1-1 . . . 804-8-8. The diffractive element sets 804 may be designed to exhibit broad spectrum reflectivity (over the operationally relevant optical bandwidth) or to provide reflective spectra useful in a particular optical switching application. Each diffractive element set 804-i-j couples light from a corresponding input optical port 803-i-j to a corresponding one port 805-j of a set of eight output optical ports 805-1 . . . 805-8. Each input optical port 803 is coupled to each output optical port 805. By selecting the operational state of an optical switch 802-i (electronically, optically, optoelectronically, optomechanically, or otherwise), an optical signal from input optical source 801-i may be routed to any selected output optical port 805-j (through input optical port 803-i-j and routed by diffractive element set 804-i-j). This embodiment may be generalized to a simple N×M optical switch by constructing N sets of M input ports and M output ports. Each of the N input ports within a set of input ports is coupled to one of the M output ports via a dedicated one of N×M diffractive element sets. Each of N input optical sources is connected via a 1×M optical switch to its subset of M routing diffractive element sets. Control over the operational state of each 1×M optical switch selection of one of the M output ports for exiting of the output optical signal. Multiple output optical signals may simultaneously exit the device each output port. The N×M diffractive element set routing structures may be fabricated in a single lithographic step.

Under certain circumstances, the passing of an optical signal though a routing diffractive element set 804-i-j designed for a different input optical signal may result in optical power loss. Such loss may be compensated for by optical amplification implemented directly in the planar waveguide, e.g. in the form of erbium-doped sections of the planar waveguide though which an attenuated optical signal passes on its way to the corresponding output optical port. Alternatively, this optical loss may be reduced or eliminated by configuring the output optical ports to support multiple output optical modes (and connecting the output optical ports to multi-mode fibers or multi-mode channel waveguides, for example), and by arranging each of the diffractive element sets to couple into different specific mode(s) of the corresponding output optical port. The diffractive element sets may be designed, for example, by computer-generated interference (as disclosed in the references cited hereinabove) between an input beam (emerging from one of the input optical ports 803 of FIG. 9) and a mode of the output optical port. By arranging the various routing diffractive element sets to couple to different output port optical modes, the routing diffractive element sets may be rendered less lossy or substantially transparent for optical signals that must pass through them. In other words, an optical signal routed to enter one mode of a multimode output port may pass without appreciable loss through a routing diffractive element set designed to couple signals into a different optical mode of the multi-mode output port. Alternatively, the diffractive element sets may each be designed to couple into the lowest-order modes of the output waveguides, but be arranged so as to couple into the multimode output optical ports at slightly different angles. Such off-axis launch of a lowest-order mode couples into a superposition of modes of the multimode output port, and reduces optical loss arising from passage through non-routing diffractive element sets.

The approaches to optical waveform recognition and generation disclosed hereinabove may also lend themselves to a hybrid electronic-optical routing approach illustrated schematically in FIG. 10. In this approach, rather than encoding routing information only in a header of an optical data packet, instead every data bit within the optical data packet, shown in FIG. 10 entering decoder 901 at point A, has routing information superimposed onto it in the form of a reference temporal waveform. This may be accomplished by any suitable modulation scheme (phase, frequency, and/or amplitude) in addition to whatever modulation scheme was used to encode the data bits. For example, an amplitude-modulated data bit stream may have frequency modulation superimposed on each bit thereof, which would not necessarily affect electronic detection and decoding of the data bit stream but may nevertheless serve to enable recognition of the routing reference waveform and routing of the optical bit stream using a suitably programmed diffractive element set. The routing information enables a diffractive element set device to route the entire optical packet, without assistance from an electronically activated optical switch, from the input port to one of multiple output optical ports of the decoder 901. Decoder 901, implemented with multiple diffractive element sets based on the principles disclosed herein, recognizes the arriving route-coded bits and directs them in readable form to one of its code-specific output optical ports (in effect, selecting to which subsequent network node the packet is to be transmitted). Non-readable (i.e. non-recognized) optical signals may reach other output ports of the device, but are typically ignored. In addition, the action of decoder 901 on the coded input bit stream strips the overlaid routing code waveform from the packet (in a manner similar to that shown in the left side of FIG. 8), thereby enabling the packet to be readily read by a control unit 902 (a fraction of the packet is split off for reading; the remainder remains in the optical domain). It is assumed that the decoded packet itself also contains routing information (for determining routing at the next network node, for example). After any necessary signal grooming by unit 903

(which may include, for example, an optical thresholder and/or an optical amplifier), a 1×N optical switch 904 controlled by the electronic unit 902 is set to a selected operational state on the basis of routing information contained in the packet. The packet then enters the appropriate input of waveform generator 905 (i.e. encoder), implemented with multiple diffractive element sets based on principles disclosed herein, which recodes each bit of the packet with new routing information (in a manner similar to that shown in FIG. 7 and the right side of FIG. 8). This new routing information will control passage of the packet through the next routing node and is determined by the electronic control unit on the basis of packet encoded destination information and an electronic routing map. At point C, the packet emerges encoded with routing information from its corresponding output port. It should be noted that each output port of decoder 901 will have its own dedicated set of signal groomer 903, optical switch 904, and recoder 905. A single controller 902 may control recoding of all signals emerging from decoder 901, or each output port of decoder 901 may have a separate dedicated controller.

Figure 10:
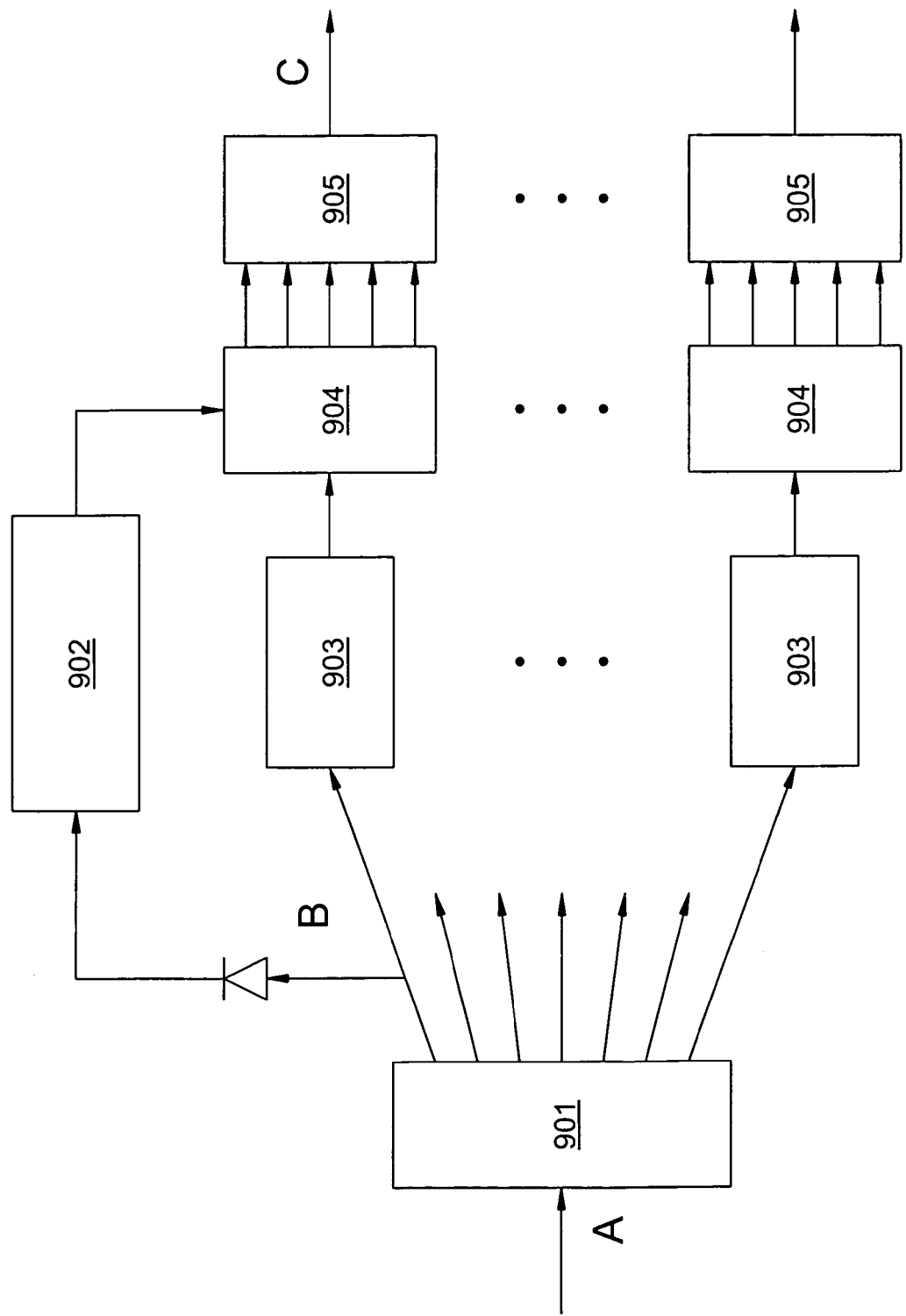
FIG. 10 illustrates a hybrid optical and electronic optical waveform routing system.

It should be noted that the routing scenario of FIG. 10 displays a degree of immunity to signal contention. It is well known that the coding of optical signals can be employed as a means of multiplexing, as in code-division-multiple access. In this approach to multiplexing, multiple channels share a common bandwidth and link yet can communicate independently. Multi-user interference limits the number of simultaneous users, yet it is clear that limited channel sharing is possible. In the present case, cases of contention between traveling packets will not typically result in data loss. As long as the network is operated under conditions where probability of many packets simultaneously colliding at a single output port is relatively small, loss of data will not typically occur and it should typically be possible to recover the packets at the next routing node. In other words, the colliding packets will be transported simultaneously along the single link—eliminating the contention that occurs when one and only one packet can travel along a single link at a given time. At point C in FIG. 10, two packets may enter a single output port with total or partial temporal overlap. It should be noted that power budget issues enter into all optical routing nodes including the one shown in FIG. 10. Depending on the nature of the encoded routing information, each routing and encoding device based on diffractive element sets will introduce a certain amount of loss. The amount of loss depends critically on the nature of the route encoding employed. To minimize loss, it may be advantageous under certain circumstances to introduce a spectral reshaping element into the signal grooming stage 903. This element will tailor a signal entering it at B so that the signal emerges with a fixed output spectrum even if spectral dips (not zeros) occur in the routing-stripped signal spectra. A saturated amplifier stage may provide this function, for example.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the Figures. The numbers of diffractive elements is reduced in the Figures for clarity. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

What is claimed is:

1. An optical apparatus, comprising a planar optical waveguide having at least one set of diffractive elements, the planar optical waveguide substantially confining in one transverse spatial dimension optical signals propagating in two other spatial dimensions therein, wherein:
   each diffractive element set routes, between corresponding input and output optical ports with a corresponding impulse response function, a corresponding diffracted portion of an input optical signal propagating in the planar waveguide that is diffracted by the diffractive element set;
   the input optical signal has an input temporal waveform, the output optical signal has an output temporal waveform, and the output temporal waveform is given by a convolution of the input temporal waveform and the impulse response function;
   the input optical signal is successively incident on the diffractive elements; and
   the diffractive elements of the set are arranged so that the corresponding impulse response function comprises one of i) a corresponding reference temporal waveform, or ii) a time-reverse of the corresponding reference temporal waveform.

2. The apparatus of claim 1, wherein:
   the optical element has multiple sets of diffractive elements; and
   the diffractive elements of the sets are arranged so that i) the corresponding impulse response functions are each proportional to a corresponding one of a set of reference temporal waveforms, or ii) the corresponding impulse response functions are each proportional to a time-reverse of the corresponding one of the set of reference temporal waveforms.

3. The apparatus of claim 2, wherein at least two of the multiple diffractive element sets are overlaid.

4. The apparatus of claim 2, wherein at least two of the multiple diffractive element sets are positioned sequentially.

5. The apparatus of claim 2, wherein at least two of the multiple diffractive element sets are interleaved.

6. The apparatus of claim 2, further comprising an input optical switch arranged to route an input optical signal from a single optical input source to one of multiple optical input ports selected based on the operational state of the switch, wherein the output temporal waveform comprises a selected one of the set of reference temporal waveforms, the operational state of the switch determining which one of the set of reference temporal waveforms is selected.

7. The apparatus of claim 2, wherein an input temporal waveform that includes one of the set of reference temporal waveforms results in a corresponding output optical waveform that i) exceeds a discrimination threshold at a corresponding one of multiple optical output ports, and ii) remains below the discrimination threshold at others of the multiple optical output ports.

8. The apparatus of claim 7, further comprising an optical switch, wherein the operational state of the optical switch is determined at least in part by which of the multiple output optical ports receives an output optical waveform that exceeds the discrimination threshold.

9. The apparatus of claim 7, further comprising an array of photodetectors arranged so that each photodetector receives a corresponding output optical signal from a corresponding one of the multiple output optical ports.

10. The apparatus of claim 1, wherein:
an input temporal waveform that includes the corresponding reference temporal waveform results in an output optical waveform that exceeds a discrimination threshold; and
an input temporal waveform that does not include the corresponding reference temporal waveform results in an output optical waveform that remains below the discrimination threshold.

11. The apparatus of claim 10, wherein the optical apparatus is operationally coupled to an optical switch so that the operational state of the optical switch is determined at least in part by whether the output optical waveform exceeds the discrimination threshold.

12. The apparatus of claim 10, wherein the optical apparatus is operationally coupled to another device so that the operational state of the other device is determined at least in part by whether the output optical waveform exceeds the discrimination threshold.

13. The apparatus of claim 1, wherein the output temporal waveform comprises the corresponding reference temporal waveform.

14. The apparatus of claim 1, wherein the output temporal waveform comprises the time-reverse of the corresponding reference temporal waveform.

15. The apparatus of claim 1, wherein the diffractive elements are curvilinear diffractive elements.

16. The apparatus of claim 1, wherein the planar optical waveguide comprises a core surrounded by lower-index cladding, and the diffractive elements are located i) at an interface between the core and the cladding, ii) in the core, or iii) in the cladding.

17. The apparatus of claim 1, further comprising at least one region of the planar waveguide providing optical amplification for optical signals propagating therein and positioned so as to amplify an optical signal routed between at least one input optical port and at least one output optical port.

18. A method, comprising:
launching an optical signal having an input temporal waveform through an input optical port into a planar waveguide, the planar optical waveguide substantially confining in one transverse dimension the optical signal propagating in two other dimensions therein; and
receiving from the planar optical waveguide through an output optical port at least one diffracted portion of the input optical signal diffracted by a corresponding one of at least one diffractive element set of the planar waveguide, the diffracted portion of the input optical signal comprising an output optical signal having an output temporal waveform,
wherein:
each diffractive element set routes, between corresponding input and output optical ports with a corresponding impulse response function, the corresponding diffracted portion of the input optical signal propagating in the planar waveguide that is diffracted by the diffractive element set;
the input optical signal is successively incident on the diffractive elements; and
the diffractive elements of the set are arranged so that the corresponding impulse response function comprises one of i) a corresponding reference temporal waveform, or ii) a time-reverse of the corresponding reference temporal waveform.

19. The method of claim 18, wherein:
the optical element has multiple sets of diffractive elements;
the optical element has multiple sets of diffractive elements; and
the diffractive elements of the sets are arranged so that i) the corresponding impulse response functions are each proportional to a corresponding one of a set of reference temporal waveforms, or ii) the corresponding impulse response functions are each proportional to a time-reverse of the corresponding one of the set of reference temporal waveforms.

20. The method of claim 19, wherein an input temporal waveform that includes one of the set of reference temporal waveform results in a corresponding output optical waveform that i) exceeds a discrimination threshold at a corresponding one of multiple optical output ports, and ii) remains below the discrimination threshold at others of the multiple optical output ports.

21. The method of claim 20, further comprising selecting an operational state of an optical switch, wherein the operational state of an optical switch is determined at least in part by which of the multiple output optical ports receives an output optical waveform that exceeds the discrimination threshold.

22. The method of claim 20, wherein a corresponding output optical signal from a corresponding one of the multiple output optical ports is received by a corresponding one of an array of photodetectors.

23. The method of claim 19, wherein at least two of the multiple diffractive element sets are overlaid.

24. The method of claim 19, wherein at least two of the multiple diffractive element sets are positioned sequentially.

25. The method of claim 19, wherein at least two of the multiple diffractive element sets are interleaved.

26. The method of claim 19, further comprising routing, with an input optical switch, an input optical signal from a single optical input source to one of multiple optical input ports selected based on the operational state of the switch, wherein the output temporal waveform comprises a selected one of the set of reference temporal waveforms, the operational state of the switch determining which one of the set of reference temporal waveforms is selected.

27. The method of claim 18, wherein:
an input temporal waveform that includes the corresponding reference temporal waveform results in an output optical waveform that exceeds a discrimination threshold; and
an input temporal waveform that does not include the corresponding the reference temporal waveform results in an output optical waveform that remains below the discrimination threshold.

28. The method of claim 27, further comprising selecting an operational state of an optical switch, the selected operational state being determined at least in part by whether the output optical waveform exceeds the discrimination threshold.

29. The method of claim 27, further comprising selecting an operational state of another device, wherein the selected operational state is determined at least in part by whether the output optical waveform exceeds the discrimination threshold.

30. The method of claim 18, wherein the output temporal waveform comprises the corresponding reference temporal waveform.

31. The method of claim 18, wherein the output temporal waveform comprises the time-reverse of the corresponding reference temporal waveform.

32. The method of claim 18, wherein the diffractive elements are curvilinear diffractive elements.

33. The method of claim 18, wherein the planar optical waveguide comprises a core surrounded by lower-index cladding, and the diffractive elements are located i) at an interface between the core and the cladding, ii) in the core, or iii) in the cladding.

34. The method of claim 18, further amplifying an optical signal routed between at least one input optical port and at least one output optical port in at least one region of the planar waveguide positioned therefor that provides optical amplification for optical signals propagating therein.

35. An optical apparatus, comprising:
a planar optical waveguide having N×M sets of diffractive elements, the planar optical waveguide substantially confining in one transverse spatial dimension optical signals propagating in two other spatial dimensions therein, wherein
each diffractive element set routes, between a corresponding one of N×M input optical ports and a corresponding one of M output optical ports, a corresponding diffracted portion of an input optical signal propagating in the planar waveguide that is diffracted by the diffractive element set,
the input optical signal is successively incident on the diffractive elements, and
for each pair of one of the N×M input optical ports and one of the M output optical ports there is a corresponding one of the N×M diffractive element sets that routes an optical signal therebetween; and
a set of N 1×M optical switches, each 1×M optical switch coupling a corresponding one of N input optical sources to a corresponding one of N disjoint subsets of M input optical ports, so that an input optical signal from any one of the N input optical sources may be routed to any one of the M output optical ports based on the operational state of the corresponding 1×M optical switch.

36. The apparatus of claim 35, further comprising at least one region of the planar waveguide providing optical amplification for optical signals propagating therein and positioned so as to amplify an optical signal routed between at least one input optical port and at least one output optical port.

37. The apparatus of claim 35, wherein:
the output optical ports each support multiple optical transverse modes; and
the N diffractive element sets that route optical signals to a corresponding one of the M output optical ports are arranged to route the corresponding optical signals into different corresponding optical modes of the corresponding output optical port, thereby reducing optical loss induced by passage of the routed optical signal through others of the diffractive element sets.

38. The apparatus of claim 35, wherein multiple output optical signals may be routed to a single output optical port simultaneously.

39. The apparatus of claim 35, wherein the operational states of the 1×M optical switches may be determined at least in part by routing information extracted from input optical signals of the corresponding input optical sources.

40. The apparatus of claim 35, wherein the diffractive elements are curvilinear diffractive elements.

41. The apparatus of claim 35, wherein the planar optical waveguide comprises a core surrounded by lower-index cladding, and the diffractive elements are located i) at an interface between the core and the cladding, ii) in the core, or iii) in the cladding.

42. A method, comprising:
launching an optical signal from one of N input optical sources into a planar waveguide through one of N×M input optical ports, the planar optical waveguide substantially confining in one transverse dimension the optical signal propagating in two other dimensions therein; and
receiving from the planar optical waveguide through one of M output optical ports at least one diffracted portion of the optical signal diffracted by a corresponding one of N×M diffractive element sets of the planar waveguide,
wherein:
each diffractive element set routes, between a corresponding one of the N×M input optical ports and a corresponding one of the M output optical ports, a corresponding diffracted portion of an input optical signal propagating in the planar waveguide that is diffracted by the diffractive element set;
the input optical signal is successively incident on the diffractive elements;
for each pair of one of the N×M input optical ports and one of the M output optical ports there is a corresponding one of the N×M diffractive element sets that routes an optical signal therebetween; and
a set of N corresponding 1×M optical switches each couple a corresponding one of the N input optical sources to a corresponding one of N disjoint subsets of M input optical ports, so that an input optical signal from any one of the N input optical sources may be routed to any one of the M output optical ports based on the operational state of the corresponding 1×M optical switch.

43. The method of claim 42, further comprising amplifying an optical signal routed between at least one input optical port and at least one output optical port in at least one region of the planar waveguide positioned therefor that provides optical amplification for optical signals propagating therein.

44. The method of claim 42, wherein:
the output optical ports each support multiple optical transverse modes; and
the N diffractive element sets that route optical signals to a corresponding one of the M output optical ports are arranged to route the corresponding optical signals into different corresponding optical modes of the corresponding output optical port, thereby reducing optical loss induced by passage of the routed optical signal through others of the diffractive element sets.

45. The method of claim 42, wherein multiple output optical signals may be routed to a single output optical port simultaneously.

46. The method of claim 42, wherein the operational states of the 1×M optical switches may be determined at least in part by routing information extracted from input optical signals of the corresponding input optical sources.

47. The method of claim 42, wherein the diffractive elements are curvilinear diffractive elements.

48. The method of claim 42, wherein the planar optical waveguide comprises a core surrounded by lower-index cladding, and the diffractive elements are located i) at an interface between the core and the cladding, ii) in the core, or iii) in the cladding.

49. An optical apparatus, comprising a planar optical waveguide having at least one set of diffractive elements, the planar optical waveguide substantially confining in one transverse spatial dimension optical signals propagating in two other spatial dimensions therein, wherein:

each diffractive element set routes, between corresponding first and second optical ports a corresponding diffracted portion of a first optical signal propagating in the planar waveguide that is diffracted by the diffractive element set, the first optical signal having a first temporal waveform;

the first optical signal is successively incident on the diffractive elements; and the diffractive elements of the set are arranged so that
  i) a first temporal waveform comprising a string of data bits results in the corresponding diffracted portion of the first optical signal reaching the corresponding second optical port with a corresponding second temporal waveform comprising the string of data bits each having superimposed thereon a common set of routing bits, or
  ii) a first temporal waveform comprising a string of data bits each with a common string of routing bits superimposed thereon results in the corresponding diffracted portion of the first optical signal reaching the corresponding second optical port with a corresponding second temporal waveform comprising a string of data bits.

50. The apparatus of claim 49, further comprising:

a primary group of multiple diffractive element sets, each routing from a common input optical port to a corresponding one of multiple first intermediate optical ports an intermediate optical signal comprising a corresponding diffracted portion of the input optical signal, the input optical signal comprising a string of data bits each with a common string of input routing bits superimposed thereon, the intermediate optical signal comprising a string of data bits with the superimposed input routing bits removed, the corresponding first intermediate optical port being determined by substantial correspondence between the input routing bit string and a time-reversed impulse response function of one of the first group of diffractive element sets;

an optical detector arranged to receive a fraction of the intermediate optical signal;

an electronic processor programmed for selecting one of a set of output routing bit strings based on data encoded in the data bit string;

a set of optical switches, each corresponding to one of the first intermediate optical ports, optically coupled to the corresponding first intermediate optical port for receiving the corresponding intermediate optical signal therefrom and routing the corresponding intermediate optical signal to one of a corresponding set of second intermediate optical ports based on the operational state of the optical switch, the operational state of the switch being responsive to the selection of the output routing bit stream by the electronic processor;

multiple secondary groups of multiple diffractive element sets, each diffractive element set of a group routing between one of the multiple second intermediate optical ports and a corresponding one of multiple common output optical ports an output optical signal comprising a corresponding diffracted portion of the intermediate optical signal, the output optical signal comprising a string of data bits each with the output string of routing bits superimposed thereon, the output routing bit stream substantially corresponding to an impulse response function of the diffractive element set routing the intermediate optical signal to the common output optical port.

51. The apparatus of claim 50, further comprising a corresponding optical signal grooming stage between each first intermediate optical port and the corresponding optical switch.

52. The apparatus of claim 50, wherein primary group of diffractive element sets, the multiple secondary groups of diffractive element sets, and the set of optical switches are integrated on a common planar optical waveguide.

53. A method, comprising:

launching an input optical signal through an input optical port into a planar waveguide, the planar optical waveguide substantially confining in one transverse dimension an optical signal propagating in two other dimensions therein, the input optical signal having an input temporal waveform comprising a string of data bits each having superimposed thereon a common set of input routing bits; and receiving from the planar optical waveguide as an output optical signal through an output optical port at least one diffracted portion of the optical signal diffracted by a corresponding one of at least one diffractive element set of the planar waveguide, the output optical signal having an output temporal waveform comprising the string of data bits, wherein:

each diffractive element set routes, between a corresponding input optical port and a corresponding output optical port, a corresponding diffracted portion of an input optical signal propagating in the planar waveguide that is diffracted by the diffractive element set, the input optical signal having an input temporal waveform;

the diffractive elements of the set are arranged so as to remove the superimposed input routing bits from each data bit of the input temporal waveform; and the input optical signal is successively incident on the diffractive elements.

54. A method, comprising:

launching an input optical signal through an input optical port into a planar waveguide, the planar optical waveguide substantially confining in one transverse dimension an optical signal propagating in two other dimensions therein, the input optical signal having an input temporal waveform comprising a string of data bits; and receiving from the planar optical waveguide as an output optical signal through an output optical port at least one diffracted portion of the optical signal diffracted by a corresponding one of at least one diffractive element set of the planar waveguide, the output optical signal having an output temporal waveform comprising the string of data bits each having superimposed thereon a common set of output routing bits, wherein:

each diffractive element set routes, between a corresponding input optical port and a corresponding output optical port, a corresponding diffracted portion of an input optical signal propagating in the planar waveguide that is diffracted by the diffractive element set, the input optical signal having an input temporal waveform;

the diffractive elements of the set are arranged so as to superimpose the output routing bits onto each data bit of the input temporal waveform; and the input optical signal is successively incident on the diffractive elements.

* * * * *